United States Patent [19]

Gaggar et al.

[11] Patent Number: 5,164,447

[45] Date of Patent: Nov. 17, 1992

[54] POLYMER BLEND COMPOSITIONS

[75] Inventors: Satish K. Gaggar; Deborah M. Burks, both of Parkersburg, W. Va.; Larry C. Stover, Dyersburg, Tenn.

[73] Assignee: General Electric Company, N.Y.

[21] Appl. No.: 692,971

[22] Filed: Apr. 29, 1991

Related U.S. Application Data

[63] Continuation of Ser. No. 358,804, May 31, 1989, abandoned, which is a continuation-in-part of Ser. No. 59,178, Jun. 8, 1987, Pat. No. 4,857,590.

[51] Int. Cl.$^5$ .................. C08L 27/06; C08L 33/12; C08L 71/03
[52] U.S. Cl. .................. 525/64; 525/187; 525/227; 525/239; 524/366; 524/910
[58] Field of Search ............. 525/64, 187, 227, 239; 524/366, 910

[56] References Cited

U.S. PATENT DOCUMENTS

| | | | |
|---|---|---|---|
| 3,373,229 | 3/1968 | Philpot | 525/227 |
| 3,957,917 | 5/1976 | Kitaguchi | 524/533 |
| 4,719,263 | 1/1988 | Barnhouse | 525/187 |
| 4,857,590 | 8/1989 | Gaggar | 525/187 |
| 4,931,506 | 6/1990 | Yu | 525/187 |

FOREIGN PATENT DOCUMENTS 1907024  4/1971  Fed. Rep. of Germany ...... 525/187

OTHER PUBLICATIONS

Chemical Abstracts CA 94(24):193834.

Primary Examiner—David J. Buttner
Attorney, Agent, or Firm—Lowe, Price, LeBlanc & Becker

[57] ABSTRACT

Polymer blend compositions comprises a polyvinyl halide polymer, an antistatic agent and a poly(alkylmethacrylate). Suitable antistatic agents comprise copolymers of epichlorohydrin and ethylene oxide. The poly(alkyl methacrylate) is included in the compositions in an amount effective to enhance the antistatic properties of the compositions.

7 Claims, No Drawings

POLYMER BLEND COMPOSITIONS

This application is a continuation application of application Ser. No. 07/358,804, filed May 31, 1989, now abandoned which is a continuation-in-part of copending application Ser. No. 07/059,178 filed Jun. 8, 1987, now U.S. Pat. No. 4,857,590.

BACKGROUND OF THE INVENTION

1. FIELD

Polymers having electrostatic dissipative properties.

2. PRIOR ART

This invention is an improvement on the inventions described and claimed in U.S. Pat. Nos. 4,588,773 (Federl et al I) and 4,775,716 (Federl et al II) and U.S. Pat. application Ser. No. 59,178, filed Jun. 8, 1987, now U.S. Pat. No. 4,857,590 (Gagger et al), all of which are assigned to the predecessor of the present application's assignee.

Federl et al I relates to the use of an ABS graft copolymer containing a copolymer of epichlorohydrin and an oxirane composition, ethylene oxide. Federl et al II, a continuation-in-part of Federl et al I, also concerns an antistatic graft ABS, but contains smaller amounts of an epichlorophyorin/oxirane copolymer having a somewhat higher ratio of ethylene,. oxide to epichlorohydrin in said copolymer. U.S. Pat. No. 4,857,590 (Gaggar et al) is directed to the use of an alkyl methacrylate polymer to compatibilize the antistatic composition with the ABS polymer.

Barnhouse et al, U.S. Pat. No.4,719,263, discloses that the antistatic properties of various polymers, including polyvinyl chloride (PVC), may be improved by adding a copolymer of epichlorohydrin and ethylene oxide. This reference, however, makes no mention of the fact that the antistatic properties may be further enhanced by the use of a synergistic amount of the alkylene methacrylates of the present invention.

In the Gaggar et al U.S. Patent, it was pointed out that certain properties such as tensile strength, heat distortion temperature and modulus are adversely affected by the introduction of the epichlorohydrin/ethylene oxide copolymer. Even the lower levels of loading described in the Federl et al II patent result in poorer physical properties. The use of an alkyl methacrylate polymer, such as poly (methyl methacrylate) promotes the compatibility between the base polymer and the copolymer.

SUMMARY OF THE INVENTION

The present invention is directed to the use of an alkyl methacrylate polymer to synergistically improve the antistatic properties of polyvinyl chloride resins (PVC) using epichlorohydrin and ethylene oxide copolymer as an antistatic agent. While there are references to the use of such copolymers in PVC, for example in the Barnhouse et al patent mentioned above, there are no teachings of the enhancement of the antistatic properties with a synergist, such as an alkyl methacrylate polymer of the present invention.

It should be noted that most commercially available PVC products contain processing aids in small amounts, usually up to about 3% of the total resin weight. Such processing aids may include poly (methylmethacrylate) and/or other acrylics. In general, such compositions have a much higher molecular weight that the alkyl methacrylates of the present invention.

The need for thermoplastic molding compositions which rapidly dissipate a static charge has grown substantially in recent years. It is reliably estimated that static electricity costs industry millions of dollars in expensive repair and replacement of sensitive electronic components alone. Major applications for such material include tote boxes for the storage of computer chips and other electronic components, xerographic copier parts and communications equipment. Static electricity is also a major hazard where explosive materials are present.

Static electricity is very expensive to control in polymeric materials. Until the invention of Federl I, thermoplastics were generally rendered at least partially antistatic by the incorporation of conductive materials into the resin, such as carbon black particles, or carbon (or metallic) fibers. The literature is replete with attempts to render polymers antistatic all of which have met with less than sucessful results.

PVC is one of the most commmercially important thermoplastics manufactured in significant quantities. Its major uses include insulators, construction siding, wire coatings, pipe and packaging material- clear, opaque and translucent. Its versatility makes it one of the most important commodity resins manufactured worldwide.

Most PVC is made by the reaction between chlorine gas and ethylene to produce the intermediate, dichlorethylene. The dichloroethylene is then dehydrogenated to produce vinyl chloride monomer which is polymerized into PVC by known catalytic reactions. Vinyl halide resins that may be used in the compositions of this invention are the resinous products obtained by the polymerization of a vinyl halide in the presence or absence of one or more copolymerizable monomers. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer, such as vinyl acetate, vinyl propionate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those prepared from at least 70% of vinyl halide and up to 30% of the comonomer. The invention is also applicable to mixtures containing polyvinyl chloride in a major proportion and a minor proportion of such other synthetic resins as chlorinated polyethylene, polyacrylate and polymethacrylate esters, and copolymers of acrylonitrile, butadiene, and styrene as well as other compatible thermoplastic resins. In one embodiment, the polyvinyl chloride is included in the composition in an amount of 60–93 wt. %.

The antistatic agent, which constitutes 5-20 wt% of the blend, is a copolymer of an epihalohydrin, preferably epichlorohydrin, and an alkylene oxide, preferably ethylene oxide. Epihalohydrin monomers have the formula:

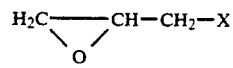

Wherein X is chlorine, bromine or iodine. Preferably X is chlorine, i.e. epichlorohydrin.

The epihalohydrin may be copolymerized with any of a variety of other known, copolymerizable monomers which have an oxirane group. Such monomers include glycidyl ethers, monoepoxides of dienes and polyenes, glycidyl esters and alkylene oxides. Examples of such monomers include vinyl glycidyl ether, isopropenyl glycidyl ether, butadiene monoxide, chloroprene monoxide, 3,4-epoxy-1-pentene, glycidyl acrylate, glycidyl methacrylate, 1,2-epoxy-3,3,3,trichloropropane, phenyl glycidyl ether, ethylene oxide, propylene oxide and trichlorobutylene oxide.

Preferably the monomer is an alkylene oxide such as ethylene oxide, propylene oxide, butylene oxide, 3,4-epoxy-1-pentene, 1,2-epoxy-3,3,3-trichloropropane. trichlorobutylene oxide and the like. Ethylene oxide is most preferred.

In one embodiment, the antistatic agent comprises epichlorohydrin and ethylene oxide in weight ratios of from about 15:85 to about 40:60.

In the preferred embodiment, epichlorohydrin and ethylene oxide are copolymerized to form an epichlorohydrin rubber. Materials of this type are made commercially under the trademark HYDRIN (B.F.Goodrich).

The discovery that alkyl methacrylates promote the antistatic activity of the epichlorohydrin/ethylene oxide copolymers is of considerable importance. First of all, the antistatic agent is relatively expensive, being available only at a cost of 10–20 times the cost of the base PVC resins. Also most antistatic agents of the type preferred for use in the present invention have a tendency to degrade certain physical properties of the PVC. It follows then that reducing the amount of expensive antistatic composition that has to be blended into the PVC results in lower manufacturing costs without sacrificing the physical properties of the resin. The use of the synergistic alkyl methacrylates of the present invention operates to enhance the electrostatic dissipative properties so that relatively smaller quantities of the electrostatic agent need be incorporated into the PVC. In one embodiment, the poly(methyl methacrylate) is included in an amount of 2–20 wt. %.

DETAILED DESCRIPTION OF THE INVENTION

The invention can best be understood by referring to certain specific examples of the compositions generally described above.

EXAMPLE 1

A blend was prepared as a control by mixing 82.5 wt% polyvinyl chloride resin (Formolon 614 with stabilizer and process aid- a product manufactured by Formosa Plastics Corporation) with 17.5 wt% of an antistatic copolymer (ASC) containing approximately 20% epichlorohydrin and 80% ethylene oxide. The two components were mixed using a Brabender mixing apparatus at a temperature of about 380 degrees F.

The melt mixed blend was then compression molded into plaques for testing the electrostatic dissipative properties as described in more detail below.

EXAMPLE 2

Using the same procedure described in Example 1, additional samples were prepared using a blend of 65 wt % polyvinyl chloride; 17.5 wt% of the anti-static agent described in Example 1; and 17.5 wt% poly(methyl methacrylate)—(V-920-Rohm & Haas). Plaques prepared in accordance with Examples 1 and 2 were tested for electrostative dissipative properties using Federal Test Standard 101B which is incorporated herein by reference. The results are set forth in Table I:

TABLE I

| Example | Decay Rate (sec.) 1 | 2 |
|---|---|---|
| Ambient | | |
| 10% Cutoff | 0.56 | 0.65 |
| 0% Cutoff | 3.58 | .40 |
| Five (5) days at 15% R.H. | | |
| 10% Cutoff | .92 | 0.10 |
| 0% Cutoff | 5.3 | 0.60 |

The data in Table I clearly indicates a dramatic improvement in the ESD properties using an alkyl methacrylate as a synergist. While poly (methyl methacrylate) (PMMA) was used in the examples, other related compositions may be used with confidence that improved performance will be obtained.

Additional examples were prepared and tested to determine the effect, if any, that the inclusion of PMMA has on key physical properties. The recipes of Examples 1 and 2 were prepared in the same manner described and then compression molded into a slab 0.125" thick. Test bars were cut from the slab and tested for the physical properties set forth in Table II below:

TABLE II

| | PVC/ASC | PVC/ASC/PMMA |
|---|---|---|
| Izod Impact, ft. lb./in. | 1.3 | 1.6 |
| Tensile Strength, psi | 4560 | 4300 |
| Elongation, % | 4.7 | 4.7 |
| Modulus, 10 psi | 3.1 | 3.0 |
| Heat Deflection Temp., F. | 148 | 159 |
| PVC = Formolon 614 (Formosa Plastics) PMMA = V920 (Rohm & Haas) | | |

In referring to the poly (alkyl methacryates) used as synergistic ESD property enhancers, it should be understood that such products are seldom available as a pure homopolymer. Accordingly, the terms "poly (alkylmethacrylate)"and "poly (methyl methacrylate)" are meant to include up to about 10 wt% of a wide range of copolymers in which methyl methacrylate is copolymerized with various other monomers, principally other acrylates, such as methyl and ethyl acrylate.

The antistatic blends of the present invention may optionally include one or more impact modifiers. PVC without any impact modifier added has very low impact strength, typically having an Izod notch impact of about 1 ft.-lb./in. Suitable impact modifiers include methyl methacrylate-butadiene-styrene (MBS) and acrylonitrile-butadiene-styrene (ABS).

While this invention has been described in connection with certain specific embodiments,.it will be obvious to those skilled in the art that other combinations may be used. Accordingly the scope of the invention should be determined solely by the appended claims.

What is claimed is:

1. A polymer blend composition comprising (a) a polyvinyl halide polymer, (b) an antistatic agent comprising a copolymer of an epihalohydrin and a copolymerizable monomer having an oxirane group, and (c) a poly (alkyl methacrylate) in an amount sufficient to enhance antistatic properties of the antistatic agent.

2. The composition of claim 1 wherein said poly (alkyl acrylate) is poly (methyl methacrylate).

3. The composition of claim 2 wherein said antistatic agent is a copolymer of epichlorohydrin and ethylene oxide.

4. The composition of claim 2 wherein said poly(methyl methacrylate) is present in an amount of 2-20% based on the weight of the polymer blend.

5. The composition of claim 3 wherein the weight ratio of epichlorohydrin the ethylene oxide in said copolymer is from about 15:85 to about 40:60.

6. The composition of claim 4 wherein said blend further includes an impact modifier.

7. An antistatic polymer blend comprising: 93-60 wt% polyvinyl chloride; 5-20 wt % of an antistatic agent consisting essentially of 15-40 wt. % epichlorohydrin and 85-60 wt. % ethylene oxide; and 2-20 wt. % (methylmethacrylate) poly (methyl methacrylate).

* * * * *